United States Patent [19]
Brié et al.

[11] 3,855,174
[45] Dec. 17, 1974

[54] METHOD OF MANUFACTURE OF COMPOSITE MATERIALS CONSISTING OF CARBON FIBERS AND RESIN AND MATERIALS THUS OBTAINED

[75] Inventors: Michel Brié, Orsay; Gérard Riess, Mulhouse, both of France

[73] Assignee: Commissariat a L'Energie Atomique, Paris, France

[22] Filed: Dec. 20, 1973

[21] Appl. No.: 426,553

Related U.S. Application Data

[63] Continuation of Ser. No. 235,302, March 16, 1972, abandoned.

[30] Foreign Application Priority Data

Mar. 19, 1971  France .............................. 71.09822

[52] U.S. Cl. .......... 260/40 R, 106/288, 106/308 M, 117/72, 117/121, 117/161 A, 117/161 UD, 117/161 UZ, 117/161 UC, 117/161 ZA, 260/37 EP, 260/37 N, 260/42.14, 260/42.15, 260/42.16

[51] Int. Cl............................................ C08g 51/08

[58] Field of Search.... 260/41.5 R, 37 N, 41, 42.14, 260/42.15, 42.16, 40 R, 37 EP; 117/126 GE, 126 GB, 126 AB, 72, 121, 161 A, 161 UD, 161 UZ, 161 UG, 161 ZA; 106/288, 308 M

[56] References Cited
UNITED STATES PATENTS

| | | | |
|---|---|---|---|
| 3,412,062 | 11/1968 | Johnson | 260/37 |
| 3,484,223 | 12/1969 | Vanderbilt | 117/126 |
| 3,674,542 | 4/1972 | Vanderbilt | 117/72 |
| 3,762,941 | 10/1973 | Hou | 117/93.1 CD |

Primary Examiner—Allan Lieberman
Assistant Examiner—H. H. Fletcher
Attorney, Agent, or Firm—Cameron, Kerkam, Sutton, Stowell & Stowell

[57]  ABSTRACT

In a method of manufacture of composite materials consisting of carbon fibers and resin, a block or graft copolymer is fixed on carbon fibers and the fibers thus treated are then incorporated in a resin which is compatible with a single type of sequence of the copolymer.

13 Claims, No Drawings

METHOD OF MANUFACTURE OF COMPOSITE MATERIALS CONSISTING OF CARBON FIBERS AND RESIN AND MATERIALS THUS OBTAINED

This is a Continuation, of application Ser. No. 235,302, filed Mar. 16, 1972 and now abandoned.

This invention relates to a method of manufacture of composite materials consisting of carbon fibers and resin, and to the materials thus obtained.

When a test-piece formed of composite material of carbon fibers and resin and manufactured in accordance with conventional methods is subjected to shearing stresses, delamination between the fibers and the matrix is generally observed. This delamination is liable to result in fracture of the test-piece.

The invention provides a method of manufacture of composite materials consisting of carbon fibers and resin which correspond more effectively to practical requirements than those of the prior art, especially insofar as the invention makes it possible to obtain composite materials having higher mechanical strength. The primary object of the invention is to improve the bond between the carbon surface and the resin constituting the matrix of the composite material.

The method according to the invention is mainly characterized in that a block or graft copolymer is fixed on carbon fibers and the fibers thus treated are then incorporated in a resin which is compatible with a single type of sequence of the copolymer.

In accordance with the method under consideration, the resin which is intended to constitute the matrix of the composite material can be selected by way of example from the group consisting of polyesters, epoxy resins, polyimides.

According to an advantageous characteristic feature of the invention, the copolymer is of the type having the sequence A–B, wherein B is fixed at the end of chain of A.

According to another characteristic feature of the invention, the copolymer is of A–B graft type, in which B is in the form of grafts on the sequence A.

The copolymer can also be of the type having the sequence A-B-A or of the type having the sequence B-A-B.

In these different types of copolymers, A represents a polymer sequence which is capable of forming a chemical bond with the carbon fiber and B represents a sequence which is compatible with the resin and/or a sequence capable of forming a chemical bond with the carbon fiber.

According to the method of the invention, the polymers A and B are incompatible with each other so as to ensure separation in microphases.

The polymer A is a saturated or unsaturated elastomer. This polymer is intended to absorb the tensile stresses between the fiber and the resin which constitutes a rigid matrix. By way of non-limitative examples of polymers which can constitute the sequence A of the copolymer, mention can be made of the following: polyisoprene, polybutadiene, poly (butadiene-co-acrylic acid), poly (butadiene-co-methacrylic acid), polyisobutylene, the polysiloxanes, the polyacrylates.

The polymer B must be compatible with the resin, that is to say in the case of polyesters, epoxy resins or polyimides, must comprise polar groups such as the anhydride, ester, nitrile, hydroxyl, carboxyl groups. Furthermore, the polymer B may comprise functions which are capable of reacting with the resin or alternatively double bonds which can be cross-linked, in the presence of monomer, with the resin when this latter is unsaturated. By way of non-limitative examples of polymers which can constitute the sequence B of the copolymer, mention can be made of the vinyl acetate-vinyl chloride copolymer, the alternate maleic anhydride-styrene copolymer, the maleic anhydride-methyl methacrylate copolymer, the maleic anhydride-polyethylene copolymer, the polyvinyl-pyridine copolymer.

In one mode of application of the method according to the invention, the graft copolymer of type A-B is fixed in the following manner: the sequence A is first fixed on the fiber and the sequence B is then grafted onto A.

The elastomer sequence A is fixed on the fiber by means of a covalent bond formed by radical or ionic grafting.

Radical grafting consists in initiating polymerization in the presence of the fibers by forming free radicals either under the action of heat in the presence or not of substances such as peroxides, hydroperoxides, azoic derivatives, or by means of redox systems, or by radiation.

Anionic grafting consists either in de-activating an anionic polymer on a superficial function of the carbon fiber, or in initiating growth of the polymer chain A directly from the fiber which has been previously treated with a metal such as lithium, for example.

It is also possible to fix the elastomer sequence A on the fiber by means of ionic bonds such as a hydrogen bond, a dipole-dipole bond, a saline bond. In order to form these ionic bonds, polar functional groups such as carboxyl groups are formed both on the fiber and on the polymer A. These carboxyl groups are formed on the fiber by oxidizing either in a liquid or gaseous medium. Carboxyl groups are formed on the polymer A by copolymerizing it with a monomer such as acrylic acid or methacrylic acid, for example, or alternatively by reacting the polymer with a reagent such as thioglycollic acid.

After having fixed the polymer sequence A on the fiber, the polymer sequence B is fixed on the polymer A either by means of covalent bonds or by means of ionic bonds.

In another mode of application of the method according to the invention, the pre-formed block copolymer A-B is fixed directly on the fiber by means of the sequence A, either by means of covalent bonds which are preferably formed by anionic grafting or by ionic bonds.

A clearer understanding of the invention will be gained from the following description of examples of application of the method which are given without implied limitation:

EXAMPLE 1

Carbon fibers are oxidized by ozone for a period of 5 hours at 70°C;

After treatment with 0.1 N sodium hydroxide at boiling point over a period of 8 hours and acidification with 0.1 N HCl, the fibers are washed with distilled water, dried and salified by means of sodium methanolate in the presence of phenolphthalein;

The fibers are then soaked for 24 hours in a solution of block copolymer which has previously been salified by sodium methanolate [0.1 g of poly (carboxylated isoprene-b-styrene-co-maleic anhydride) in 100 cm³ of benzene containing 10 percent acetone];

The fibers are washed with acetone and dried under vacuum at 50°C.

The conditions of molding are as follows:

| | |
|---|---|
| Epoxy resin | 1C g |
| Hardener | 0.25 g |
| Molding pressure | 2 kg/cm² |
| Temperature | 160°C |
| Duration | 2 hours, |

Prior to molding, the fibers are pre-impregnated for a period of 30 minutes at 80°C with a solution of resin (8 g of resin in 2 g of acetone). After drying-out, the fibers are again impregnated under the same conditions of duration and of temperature with the resin and the hardener.

Measurements of the ultimate shearing strength (load at fracture) $\sigma r$ have been carried out on samples of composite materials manufactured in accordance with the method described in the foregoing.

By way of comparison, measurements have been taken with a view to determining the ultimate shearing strength of fibers which have been solely treated with ozone (for a period of 5 hours at 70°C).

The results are given in the following table:

| Treatment | $\sigma r$ (kg/mm²) |
|---|---|
| Oxydation O₃ | from 5.24 to 5.58 |
| Oxydation O₃ + block copolymer | from 6.43 to 8.13 |

It should be noted that the ultimate shearing strength of a composite containing untreated fibers is 4.7 kg/mm².

EXAMPLE 2

Carbon fibers are oxidized and salified under the conditions of Example 1.

The fibers are then soaked in a solution of polyisoprene-maleic anhydride-styrene (PI-MAS) copolymer in the pure carboxylated state, the proportions of which are as follows:

PI 23.6 percent ($M = 25,000$)

MAS 76.4 percent

The fibers are then washed and incorporated in an epoxy resin of the type designated as CIBA 24/556/HT973.

The ultimate shearing strength of the composite obtained is 6.82 kg/mm².

EXAMPLE 3

The carbon fibers are oxidized and salified as in the previous examples.

The fibers are then soaked in a soluation of raw carboxylated PI - MAS copolymer which is very rich in PI (41 percent) having a molecular weight of 32,000.

The operation is then carried out as in the preceding example.

The ultimate shearing strength of the composite obtained is 6.66 kg/mm².

EXAMPLE 4

After having oxidized and salified carbon fibers under the same conditions as in the preceding examples, said fibers are put into a solution of a carboxylated, raw graft copolymer PI - MAS which contains 44.5 percent PI and 55.5 percent MAS.

The fibers are then soaked in an epoxy resin under the same conditions as in the foregoing.

The ultimate shearing strength of the composite obtained is 7.7 kg/mm².

EXAMPLE 5

A non-carboxylated PI - MAS copolymer is employed, in which the MAS sequences are grafted onto polyisoprene.

The proportions are as follows:

PI 15 percent ($M = 15,000$ )

MAS 85 percent

The polyisoprene is dissolved solely in acetone and an emulsion is obtained. Salification is then carried out by means of 0.1 N NaOH in order to salify one anhydride group out of two.

The fibers which have previously been oxidized and salified as in the preceding examples, are then soaked in the copolymer and then in the epoxy resin. The MAS sequences react both with the matrix and fibers.

The ultimate shearing strength of the composite obtained is 6.12 kg/mm².

EXAMPLE 6

There is employed an elastomer sequence constituted by a carboxylated polybutadiene (constituted by a polybutadiene) ($M = 15,000$) containing 0.7 to 0.8 × 10⁻³ COOH groups per g of polymer. After this sequence has been fixed on the fiber which has been pre-oxidized in air, the MAS copolymer is grafted in the presence of benzoyl peroxide in a benzene medium at 60°C.

The ultimate shearing strength of the composite obtained is 6.95 kg/mm².

The method according to the invention therefore permits a considerable improvement in the mechanical strength of composite materials consisting of carbon fibers and resin. Moreover, the materials obtained in accordance with the invention have very high resistance to water since the presence of the block polymer layer prevents migration of water between the fiber and the matrix.

These composite materials are constituted by fibers 15 to 25 $\mu$ in diameter.

Said materials are suited to the fabrication of rotor blades for helicopters, reservoirs, containers which are intended to possess substantial resistance to high pressures. Such materials are especially applicable to the fabrication of fenders (wings), hoods (bonnets), and airbrakes for racing cars.

These composite materials have an advantage in that they combine high strength with very light weight.

What we claim is:

1. A method of manufacture of a composite material of carbon fibers and resin comprising the steps of oxidizing and salifying the carbon fibers, then fixing on the treated carbon fibers by an ionic bond a block or graft copolymer of two different polymers which are incompatible with each other, the first of these polymers being an elastomer selected from the group consisting of polyisoprene, polybutadiene, poly (butadiene-co-acrylic acid), poly (butadiene-co-methacrylic-acid), polyisobutylene, polysiloxanes and polyacrylates, the second polymer being selected from the group consisting vinyl acetate-vinyl chloride copolymer, alternate maleic anhydride-styrene copolymer, maleic anhydride-polyethylene copolymer and polyvinylpyridine copolymer, the ionic bond being selected from the group consisting of a hydrogen bond, a dipole-dipole bond and a saline bond and then incorporating the fibers thus treated in a resin compatible with the second polymer of the copolymers.

2. A method according to claim 1, wherein the resin is selected from the group consisting of the polyesters, the epoxy resins, the polyimides.

3. A method according to claim 1, the copolymer being of the A-B block type, B being fixed at the end of chain of A.

4. A method according to claim 1, the copolymer being of the A-B graft type, in which B is in the form of grafts on the sequence A.

5. A method according to claim 1, the copolymer being of the A-B-A block type.

6. A method according to claim 1, the copolymer being the B-A-B block type.

7. A method according to claim 1, wherein A represents a polymer sequence capable of forming a chemical bond with the carbon fiber and B represents a sequence selectively compatible with the resin and forming a chemical bond with the carbon fiber.

8. A method according to claim 4, wherein the sequence A is first fixed on the fiber, the sequence B being then grafted onto A.

9. A method according to claim 8, wherein the sequence A is fixed on the fiber by means of covalent bonds formed by radical or ionic grafting.

10. A method according to claim 8, wherein the sequence B is grafted onto the sequence A by a covalent bond.

11. A method according to claim 8, wherein the sequence B is grafted onto the sequence A by ionic bonds.

12. A method according to claim 3, wherein the preformed block copolymer A-B is fixed directly on the fiber by means of the sequence A with the aid of covalent bonds formed by anionic grafting.

13. A method according to claim 3, wherein the preformed block copolymer A-B is fixed directly on the fiber by means of the sequence A with the aid of a hydrogen bond, a dipole-dipole bond, or a saline bond.

* * * * *